United States Patent
Nishikouji et al.

(10) Patent No.: US 6,330,108 B1
(45) Date of Patent: Dec. 11, 2001

(54) COMPOSITE RETARDER PLATE, OPTICALLY COMPENSATORY POLARIZING PLATE AND LIQUID-CRYSTAL DISPLAY DEVICE

(75) Inventors: Yuuichi Nishikouji; Hiroyuki Yoshimi, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/667,773

(22) Filed: Sep. 22, 2000

(30) Foreign Application Priority Data

Sep. 22, 1999 (JP) .................................................. 11-269059

(51) Int. Cl.$^7$ ....................................................... G02B 5/30
(52) U.S. Cl. ........................... 359/499; 359/497; 349/96; 349/99
(58) Field of Search ................................... 359/494, 497, 359/499, 500; 349/96, 99, 102

(56) References Cited

U.S. PATENT DOCUMENTS

| 5,504,603 | 4/1996 | Winker et al. | 359/73 |
| 5,793,455 | * 8/1998 | Nakamura | 349/96 |
| 5,986,732 | * 11/1999 | Ozeki et al. | 349/99 |
| 6,034,754 | * 3/2000 | Sato et al. | 349/102 |

FOREIGN PATENT DOCUMENTS

| 7-35924 | 2/1995 | (JP) . |
| 7-306406 | 11/1995 | (JP) . |
| 10-123506 | 5/1998 | (JP) . |

OTHER PUBLICATIONS

Patent Abstracts of Japan 10123506 May 15, 1998.
Patent Abstracts of Japan 07035924 Feb. 7, 1995.

* cited by examiner

Primary Examiner—Darren Schuberg
(74) Attorney, Agent, or Firm—Sughrue, Mion, Zinn, Macpeak & Seas, PLLC

(57) ABSTRACT

A composite retarder plate is a laminate including (A) at least one retarder layer made of a high-molecular film satisfying the relation nx>ny>nz, (B) at least one retarder layer satisfying the relation nx≧ny>nz and having an optical axis inclined relative to a direction of a normal line with respect to a plane of the layer, and (C) at least one retarder layer satisfying the relation nx>nz≧ny or nx>ny>nz when nx and ny are in-plane refractive indices and nz is a refractive index in a direction of thickness, wherein ΔNxy and Rth given by Nx≧Ny, (Nx−Ny)·D=ΔNxy and {(Nx+Ny)/2−Nz}·D=Rth and based on monochromatic light with a wavelength of 590 nm are in a range of from 25 to 100 nm and in a range of from 100 to 300 nm respectively when Nx and Ny are in-plane refractive indices in the laminate, Nz is a refractive index in a direction of thickness of the laminate and D is the thickness of the laminate.

6 Claims, 2 Drawing Sheets

COMPARATIVE EXAMPLE

EXAMPLE 1

COMPOSITE RETARDER PLATE, OPTICALLY COMPENSATORY POLARIZING PLATE AND LIQUID-CRYSTAL DISPLAY DEVICE

BACKGROUND OF THE INVENTION

1. Field of the Invention

The present invention relates to a composite retarder plate and an optically compensatory polarizing plate which can highly compensate for birefringence owing to TN liquid crystal in order to form a liquid-crystal display device excellent in viewing angle and contrast.

The present application is based on Japanese Patent Application No. Hei. 11-269059, which is incorporated herein by reference.

2. Description of the Related Art

TFT-LCD (liquid-crystal display) devices using TN liquid crystal have come into wide use for television sets, personal computer monitors, etc. because quick response characteristic and frontal-view high contrast characteristic have attracted a great deal of attention. In the meantime, the viewing angle range permitting good visibility has been narrowed owing to remarkable lowering of oblique-view contrast, reversal of gradation display (tone reversal), etc. The viewing angle range has needed to be mended. Improvement of contrast, widening of the viewing angle range, suppression of display color change owing to viewing angle and uniformity of screen display have become particularly important subjects with the advance of increase in screen size.

A proposal to use a retarder for compensating for phase difference owing to birefringence of TN liquid crystal in order to widen the viewing angle has been made heretofore as a measure against the aforementioned narrowed viewing angle range. A Wide View Film (tradename: made by Fuji Photo Film Co., Ltd.), an NH Film (tradename: made by Nippon Petrochemicals Co., Ltd.) and superposed compensating plates (Unexamined Japanese Patent Publication No. Hei. 7-306406, Unexamined Japanese Patent Publication No. Hei. 7-35924 and Unexamined Japanese Patent Publication No. Hei. 10-123506) are known as compensating plates for widening the viewing angle. The Wide View Film is made of discotic liquid crystal with an inclined optical axis and exhibits negative refractive index anisotropy. The NH Film is made of nematic liquid crystal with an inclined optical axis and exhibits positive refractive in ex anisotropy. Each of the superposed compensating plates is made of a laminate of retarders. Each of the retarders is made of a uniaxial oriented film of a polymer exhibiting birefringence characteristic. In each of the superposed compensating plates, a retarder having an optical axis in a plane and a retarder having an optical axis inclined with respect to the plane are used in combination so that refractive index directions of the retarders cross at right angles.

The Wide View Film, however, had a problem that a coloring phenomenon occurred in a white display state without application of any voltage because of remarkable lowering of contrast at a viewing angle inclined by 60 degrees or more with respect to the frontal direction. The NH Film had a problem that a black display state with application of a voltage was not kept when the viewing angle was changed in the black display state. The superposed compensating plates had a problem that a remarkable coloring phenomenon occurred owing to the change of the viewing angle. Hence, the background-art compensating plates could not be adapted to phase difference characteristic of TN liquid crystal satisfactorily, and there was a problem that improvement in visibility characteristic of the background-art compensating plates was not sufficient.

SUMMARY OF THE INVENTION

An object of the present invention is to develop a retarder by which it is possible to constitute a liquid-crystal display device which is able to highly compensate for phase difference owing to birefringence of TN liquid crystal even in the case of a large screen size, and which is excellent in viewing angle while being contrast free from tone reversal, in suppression of display color change owing to the viewing angle and in uniformity of screen display.

According to an aspect of the present invention, there is provided a composite retarder plate comprising a laminate including (A) at least one retarder layer made of a high-molecular film satisfying the relation nx>ny>nz, (B) at least one retarder layer satisfying tie relation nx≧ny>nz and having an optical axis inclined relative to a direction of a normal line with respect to a plane of the layer, and (C) at least one retarder layer satisfying the relation nx>nz≧ny or nx>ny>nz when nx and ny are in-plane refractive indices and nz is a refractive index in a direction of thickness, wherein ΔNxy and Rth given by Nx≧Ny, (Nx−Ny)·D=ΔNxy and {(Nx+Ny)/2−Nz}·D=Rth and based on monochromatic light with a wavelength of 590 nm are in a range of from 25 to 100 nm and in a range of from 100 to 300 nm respectively when Nx and Ny are in-plane refractive indices in the laminate, Nz is a refractive index in a direction of thickness of the laminate and D is the thickness of the laminate.

The present invention further provides: an optically compensatory polarizing plate which comprises a laminate including the aforementioned composite retarder plate and a polarizing plate; and a liquid-crystal display device which comprises a polarizing plate, a liquid-crystal cell, and the aforementioned composite retarder plate disposed between the polarizing plate and the liquid-crystal cell.

According to the present invention, the phase difference characteristic of ΔNxy and Rth can be achieved by composite phase difference based on the aforementioned combination of the retarder layers (A), (B) and (C). Accordingly, it is possible to obtain a retarder that can highly compensate for phase difference owing to birefringence of TN liquid crystal at all azimuth angles. Hence, it is possible to form a liquid-crystal display device which is free from tone reversal even in the case where the liquid-crystal display device is applied to a large-size screen, which is so wide in viewing angle and the display color hardly changes owing to the viewing angle, and which is excellent in uniformity of contrast and screen display.

Features and advantages of the invention will be evident from the following detailed description of the preferred embodiments described in conjunction with the attached drawings.

DETAILED DESCRIPTION OF THE PREFERRED EMBODIMENTS

A composite retarder plate according to the present invention comprises a laminate including (A) at least one retarder layer made of a high-molecular film satisfying the relation nx>ny>nz, (B) at least one retarder layer satisfying the relation nx≧ny>nz and having an optical axis inclined relative to a direction of a normal line with respect to a plane of the layer, and (C) at least one retarder layer satisfying the relation nx>nz≧ny or nx>ny>nz. Hereupon, nx and ny are in-plane refractive indices and nz is a refractive index in a direction of thickness. Further, ΔNxy and Rth given by Nx≧Ny, (Nx−Ny)·D=ΔNxy and {(Nx+Ny)/2−Nz}·D=Rth and based on monochromatic light with a Wavelength of 590 nm are in a range of from 25 to 100 nm and in a range of from 100 to 300 nm respectively when Nx and Ny are in-plane refractive indices in the laminate, Nz is a refractive index in a direction of thickness of the laminate and D is the thickness of the laminate.

Figure 1:
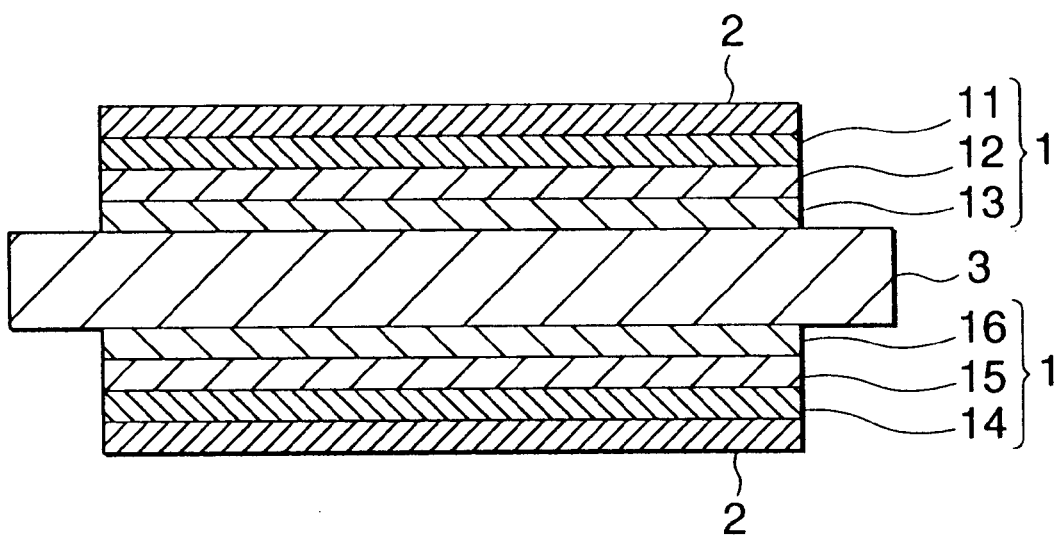
FIG. 1 is a sectional view showing an example of a liquid-crystal display device.

FIG. 1 shows an embodiment of the composite retarder plate. The reference numeral 1 designates a composite retarder plate comprising a laminate of retarder layers (A), (B) and (C); 11 and 14, retarder layers (A); 12 and 15, retarder layers (B); and 13 and 16, retarder layers (C). Incidentally, FIG. 1 shows the case where the composite retarder plate is used to form a liquid-crystal display device. The reference numeral 2 designates a polarizing plate; and 3, a liquid-crystal cell.

Each of the retarder layers (A) is made of a high-molecular film satisfying the relation nx>ny>nz. That is, each of the retarder layers (A) is made of a high-molecular film having refractive index anisotropy (nx>ny) in a plane and exhibiting refractive index characteristic in which a refractive index in a direction of thickness is smaller (ny>nz) than the in-plane refractive indices. Incidentally, nx and ny mean in-plane refractive indices and nz means a refractive index in the direction of thickness (this applies hereinafter). The retarder layer (A) preferred from the point of view of the compensating effect is a layer exhibiting birefringence characteristic in which: Δnxy defined by the formula (nx−ny)·d is in a range of from 5 to 50 nm; and rth defined by the formula {(nx+ny)/2−nz}·d is in a range of from 30 to 100 nm. Incidentally, d is the thickness of the layer (this applies hereinafter).

Any suitable transparent high-molecular film exhibiting the aforementioned refractive index characteristic may be used as the high-molecular film. The material of the high-molecular film is not particularly limited. Examples of the high-molecular film are: films made of various polymers; stretched films of high molecules which were stretched so as to be oriented by a suitable method such as uniaxial orientation or biaxial orientation; and soon. Especially, a film excellent in light transmittance and uniform in orientation and phase difference may be used preferably.

Specific examples of the polymer for forming the aforementioned high-molecular film are: polycarbonate; polyallylate; polyester such as polyethylene terephthalate or polyethylene naphthalate; polysulfone; olefin polymer; norbornene polymer; acrylic polymer; styrene polymer; cellulose polymer such as triacetyl cellulose; a mixture of two or more kinds of polymers selected from the aforementioned polymers; and so on.

When the retarder layer (A) is made of a high-molecular film, the composite retarder plate may be laminated on the polarizing plate to form an optically compensatory polarizing plate in a state in which the retarder layer (A) serves also as a transparent protective layer for protecting the polarizing film. This is advantageous in reduction of thickness, shortening of the production process, etc.

The preferred from the point of view of suppression of the change of birefringence characteristic owing to stress at the time of bonding or based on lamination, stress based on the change of heat or humidity, etc. is a high-molecular film having a photoelastic coefficient of not larger than $50 \times 10^{-13}$ cm$^2$/dyn, especially not larger than $20 \times 10^{-13}$ cm$^2$/dyn, more especially not larger than $15 \times 10^{-13}$ cm$^2$/dyn in terms of absolute value. Particularly the molecular film is adapted to the case where the retarder layer (A) serves also as a transparent protective layer.

The retarder layer (B) is made of a material satisfying the relation nx≧ny>nz (negative refractive index anisotropy) and having an optical axis inclined relative to the direction of a normal line with respect to a plane of the layer. Hence, compensation can be made efficiently for a state in which the optical axis is inclined relative to a cell substrate in TN liquid crystal exhibiting positive refractive index anisotropy, especially, in a cell in a black display state based on application of a voltage. If the retarder layer (B) satisfies only negative refractive index anisotropy but does not satisfy the condition that the optical axis is inclined relative to the direction of a normal line with respect to a plane of the layer, the object of the present invention cannot be achieved.

That is, if the retarder layer satisfies only negative refractive index anisotropy, the compensating effect runs short because Δnxy obtained when the angle of incidence of monochromatic light is inclined in the direction of the maximum in-plane refractive index with the direction of the normal line as a reference point (incident angle of zero degrees) forms symmetry with respect to the maximum value of Δnxy which is maximized at the incident angle of zero degrees, and Δnxy obtained when the incident angle is inclined in a direction perpendicular to the direction of the maximum in-plane refractive index also forms symmetry with respect to the minimum value of Δnxy which is minimized at the incident angle of zero degrees.

When the characteristic that the optical axis is inclined relative to the normal line is contrariwise provided, improvement of the compensating effect can be achieved because maximization/minimization of Δnxy at the incident angle of zero degrees can be avoided. Incidentally, the minimum value of Δnxy never takes zero when the inclination type of negative refractive index anisotropy is a hybrid orientation type whereas the minimum value of Δnxy may take zero when the inclination type of negative refractive index anisotropy is a tilt orientation type.

The retarder layer (B) exhibiting the aforementioned characteristic can be formed by a suitable method so that molecules are oriented while inclined relative to the layer surface. Examples of the suitable method are a method of rolling a film of a thermoplastic polymer by use of rolls different in circumferential velocity, a method of orienting a liquid-crystal polymer under application of an electric field.

A suitable polymer may be used as the aforementioned thermoplastic polymer. For example, materials described above in the retarder layer (A) may be used. One member or a mixture of two or more members selected from the group consisting of discotic liquid-crystal polymer, nematic liquid-crystal polymer, cholesteric liquid-crystal polymer and smectic liquid-crystal polymer may be used as the liquid-crystal polymer. Especially, discotic liquid-crystal polymer as used in the Wide View Film may be used preferably from the point of view of processability of inclination orientation, etc.

The retarder layer (C) is made of a material satisfying the relation nx>nz≧ny or nx>ny>nz. Hence, a high-molecular film as exemplified in the retarder layer (A), especially, a uniaxial stretched film exhibiting positive refractive index anisotropy, or an in-plane uniaxial oriented layer of a liquid-crystal polymer as exemplified in the retarder layer (B) may be used as the retarder layer (C). The retarder layer (C) which can be preferably used from the point of view of the compensating effect is a layer exhibiting phase difference characteristic in which $\Delta$nxy is in a range of from 5 to 50 nm with respect to monochromatic light with a wavelength of 590 nm and exhibiting characteristic in which Q defined by the formula (nx−nz)/(nx−ny) is in a range of from 0 to 2.0.

The formation of the composite retarder plate can be made by lamination of the retarder layers (A), (B) and (C) used in combination so that $\Delta$Nxy and Rth given by the relations Nx$\geq$Ny, (Nx−Ny)·D=$\Delta$Nxy and {(Nx+Ny)/2−Nz}·D=Rth and based on monochromatic light with a wavelength of 590 nm are in a range of from 25 to 100 nm and a range of from 100 to 300 nm respectively when Nx and Ny are in-plane refractive indices in the laminate, Nz is a refractive index in the direction of thickness of the laminate and D is the thickness of the laminate. For the lamination, each of the retarder layers (A), (B) and (C) may be formed as a single layer or as a multi-layer.

Satisfying the aforementioned $\Delta$Nxy and Rth ranges makes it possible to form a TN type liquid-crystal display device exhibiting good contrast in all azimuth angles of about 80 degrees relative to the normal line (frontal direction) without any change of display color. Changing the combination of the retarder layers (A), (B) and (C) and/or the number of combinations makes it possible to control the values of $\Delta$Nxy and Rth in the composite retarder plate.

In the lamination of the retarder layers (A), (B) and (C), lag/lead phase axes thereof can be arranged at an optional angle. Controlling the arrangement angle of the lag/lead phase axes also makes it possible to adjust the values of $\Delta$Nxy and Rth. The lamination in which the direction of inclination of the optical axis of the retarder layer (B) and the direction of the maximum in-plane refractive index of the laminate are made to cross each other as perpendicularly (90 degrees) as possible is advantageous from the point of view of the compensating effect. Incidentally, a suitable adhesive agent such as a tackifier may be used for the lamination. In the case of a liquid-crystal polymer layer, the retarder layer (A), or the like, may be used for bonding and supporting the liquid-crystal polymer layer.

The aforementioned composition owing to the combination of the retarder layers (A), (B) and (C) makes it possible to provide novel phase difference characteristic. Hence, there can be obtained wealthy retarders exhibiting various phase difference characteristic to compensate for phase difference owing to birefringence of TN liquid crystal, the change of phase difference owing to the viewing angle, etc. Hence, high accurate compensation can be made also for difference of birefringence characteristic owing to the difference in the state of orientation of TN liquid crystal.

That is, the aforementioned background-art retarder such as Wide View Film or NH Film only comprises a combination of retarder layers (A) and (B). Hence, the compensating effect of the background-art retarder runs short because of remarkable lowering of contrast at a viewing angle of not lower than 60 degrees, occurrence of coloring in a white display state, occurrence of fading in a black display state, etc. On the contrary, when the retarder layer (C) is added so that at least three retarder layers (A), (B) and (C) make up for the shortage of the compensating effect, a TN type liquid-crystal display device having a wide viewing angle and excellent in contrast, reduction of the change of display color, etc. can be obtained.

Incidentally, the thickness of each of the retarder layers (A), (B) and (C) can be determined suitably in accordance with the target phase difference characteristic, or the like. When the retarder layer is made of a high-molecular film, the thickness of the retarder layer is generally set to be in a range of from 1 to 500 μm, especially in a range of from 3 to 350 μm, more especially in a range of from 5 to 250 μm. When the retarder layer is made of a liquid-crystal polymer, the thickness of the retarder layer is generally set to be not larger than 100 μm, especially not larger than 20 μm, more especially in a range of from 0.1 to 10 μm. The thickness of the retarder layer is not limited to the aforementioned range.

The composite retarder plate according to the present invention may be put into practical use directly or may be used in combination with a polarizing plate 2 as shown in FIG. 1 so that the laminate of the composite retarder plate and the polarizing plate is put into practical use as an optically compensatory polarizing plate. A suitable polarizing plate may be used for the formation of the optically compensatory polarizing plate. The polarizing plate is not particularly limited in terms of kind. Especially, an absorption type polarizing plate that exhibits characteristic of transmitting linearly polarized light in a predetermined plane of vibration but absorbing the other light may be used preferably from the point of view of the high degree of polarization.

Examples of the polarizing plate to be used are: a polarizing film obtained by stretching/orienting a hydrophilic high-molecular film such as a polyvinyl alcohol film, a partially formalized polyvinyl alcohol film or a partially saponified ethylene-vinyl acetate copolymer film while making the hydrophilic high-molecular film adsorb iodine and/or a dichromatic material such as a dichromatic dye; a polyene-oriented polarizing film; and so on.

The polarizing plate may be made of a polarizing film provided with a transparent protective layer formed on a single surface of the polarizing film or with transparent protective layers formed on opposite surfaces of the polarizing film. The transparent protective layer can be provided for various purposes of reinforcement of the polarizing film, improvement of heat resistance and humidity resistance, etc. The transparent protective layer can be formed as a resin coating layer, a laminated layer of resin films, or the like. The transparent protective layer may contain fine particles for diffusing light, roughening the surface, etc.

The transparent protective layer may be provided as the retarder layer (A) as described above. In this case, the retarder layer (A) 11 or 14 as a constituent member of the composite retarder plate according to the present invention can serve also as a transparent protective layer on a single surface of the polarizing film in each polarizing plate 2 as shown in FIG. 1. This is advantageous in reduction of thickness of the optically compensatory polarizing plate and improvement of assembling efficiency of a liquid-crystal display device. Incidentally, when a transparent protective layer provided separately from the composite retarder plate exhibits phase difference, it is preferable from the point of view of the compensating effect, or the like, that characteristic of the combination of the composite retarder plate and the transparent protective layer adjacent to the composite retarder plate satisfies the aforementioned condition of $\Delta$Nxy and Rth.

The polarizing plate to be used may be provided with an anti-reflection layer or an anti-glare layer particularly formed on a side opposite to the composite retarder plate for the purpose of preventing surface reflection, or the like. The anti-reflection layer may be formed suitably as a light interference film such as a coating layer of a fluorine polymer or a multilayer metal vapor deposition film. On the other hand, the anti-glare layer may be formed as a resin coating layer containing fine particles or may be formed by a suitable method of diffusing surface reflection light through a fine roughness structure applied to the surface by a suitable method such as embossing, sandblasting, etching, etc.

Examples of the aforementioned fine particles are inorganic fine particles and crosslinked or non-crosslinked organic fine particles with a mean particle size in a range of from 0.5 to 20 μm. The inorganic fine particles are made of silica, calcium oxide, alumina, titania, zirconia, tin oxide, indium oxide, cadmium oxide, antimony oxide, etc. and may be electrically conductive. The crosslinked or non-crosslinked organic fine particles are made of suitable polymers such as polymethyl methacrylate and polyurethane. One member or a combination of two or more members suitably selected from the inorganic fine particles and the crosslinked or non-crosslinked organic fine particles may be used as the fine particles.

The arrangement relationship between the lead phase axis of the composite retarder plate and the transmission axis of the polarizing plate in the optically compensatory polarizing plate can be determined suitably without any particular limitation. It is generally preferable from the point of view of controlling oblique characteristic depending on the change of the viewing angle to widen the viewing angle without any influence on frontal (perpendicular) characteristic that the transmission axis of the polarizing plate and the maximum in-plane refractive index of the composite retarder plate are arranged to be parallel or perpendicular to each other.

The respective layers such as retarder layers, polarizing plates, etc. constituting the composite retarder plate or optically compensatory polarizing plate according to the present invention may be separated from one another. It is, however, preferable from the point of view of suppression of reflection based on adjustment of interlayer refractive index difference, prevention of displacement of an optical system, prevention of entrance of an alien substance such as dust, etc. that part of the respective layers, especially all of the respective layers are fixed to one another.

A suitable material such as a transparent adhesive agent an be used for the aforementioned fixation of the respective layers. The adhesive agent is not particularly limited in terms of kind. A material not requiring a high-temperature process for curing/drying the material in the adhering process may be used preferably from the point of view of prevention of deterioration in optical characteristic of constituent members. A material not requiring a long-term curing/drying process may be used preferably. From this point of view, an adhesive layer may be used preferably.

A transparent adhesive made of a suitable polymer such as acrylic polymer, silicone polymer, polyester, polyurethane, polyether, synthetic rubber, or the like, can be used for the formation of the adhesive layer. Especially, an acrylic trackifier may be used preferably from the point of view of optical transparency, tackiness characteristic, weather resistance, etc.

Incidentally, the adhesive layer can be provided on either or each side of the composite retarder plate, the optically compensatory polarizing plate, or the like, for the purpose of bonding it to a subject such as a liquid-crystal cell as occasion demands. When the adhesive layer is exposed to the surface, a separator, or the like, may be preferably temporarily attached to the adhesive layer to prevent the surface of the adhesive layer from contamination until the adhesive layer is put into practical use.

The composite retarder plate or optically compensatory polarizing plate according to the present invention can be used preferably as a compensating plate against birefringence owing to liquid crystal, especially TN liquid crystal, for the formation of a liquid-crystal display device. A liquid-crystal display device is generally formed by the steps of: assembling a polarizing plate, a liquid-crystal cell and a compensating plate; assembling constituent members such as a back-lighting unit, a reflection plate, etc. as occasion demands; and incorporating a drive circuit thereinto. In the present invention, a liquid-crystal display device can be formed in the same manner as in the background art without any particular limitation except that the aforementioned composite retarder plate or optically compensatory polarizing plate is used.

Hence, suitable optical devices such as a light diffusing plate, an anti-glare layer, a prism sheet, an anti-reflection film and a protective film or plate to be provided on the visual side polarizing plate and an optical path control plate such as a prism sheet to be provided on the back-lighting unit can be arranged suitably when the liquid-crystal display device is formed. Generally, one compensating plate may be disposed between the liquid-crystal cell 3 and either of the visual side and back-lighting side polarizing plates 2 or two compensating plates may be disposed between the liquid-crystal cell and the visual side polarizing plate and between the liquid-crystal cell 3 and the back-lighting side polarizing plate 2 as illustrated in the drawing. Hence, the composite retarder plate or optically compensatory polarizing plate according to the present invention may be disposed on at least one side of the liquid-crystal cell.

EXAMPLE 1

A norbornene resin film (Arton: made by JSR Corp., this applies hereinafter) 100 μm thick was stretched at 175° C. by a tenter stretching machine to thereby obtain a retarder layer A1 having refractive index characteristic of nx>ny>nz and having Δnxy of 10 nm and rth of 80 nm on the basis of monochromatic light with a wavelength of 590 nm (this applies hereinafter). Incidentally, refractive indices, and so on, were measured by an automatic double-refractometer (KOBRA-21ADH: made by Oji Scientific Instruments Co., Ltd., this applies hereinafter).

Then, only an inclined oriented layer of a discotic liquid-crystal polymer in a Wide View Film (WV02A) was transferred onto the retarder layer A1 by a transferring method through an adhesive agent under a moistening process. Thus, a retarder layer B1 was laminated on the retarder layer A1 to thereby obtain a laminate having Δnxy of 20 nm and rth of 130 nm on the basis of monochromatic light with a wavelength of 590 nm. Incidentally, the transfer lamination was performed so that the direction of inclination of the discotic liquid crystal was parallel with the direction of the maximum in-plane refractive index (nx) of the retarder layer A1.

Then, a norbornene resin film 100 μm thick was uniaxially stretched at 195° C. by a stretching machine to thereby obtain a retarder layer C1 having refractive index characteristic of nx>ny>nz and having Δnxy of 35 nm and Q of 1.1. The retarder layer C1 was laminated on the retarder layer B1 through an acrylic adhesive layer to thereby obtain a composite retarder plate having ΔNxy of 55 nm and Rth of 160 nm.

Then, a polyvinyl alcohol film 75 μm thick was dyed in an aqueous solution containing iodine and then uniaxially stretched by six times between rolls different in circumferential velocity in an aqueous solution containing boric acid to thereby obtain a polarizing film. A triacetyl cellulose film 80 μm thick was bonded to a single surface of the polarizing film through a polyvinyl alcohol adhesive agent. The composite retarder plate was bonded to the other surface of the polarizing film through a polyvinyl alcohol adhesive agent so as to be laminated on the polarizing film through the retarder layer A1 of the composite retarder plate. Thus, an optically compensatory polarizing plate was obtained.

Comparative Example

An optically compensatory polarizing plate was obtained in the same manner as in Embodiment 1 except that the composite retarder plate was replaced by a laminate of the retarder layers A1 and B1 so that the laminate was bonded onto the polarizing film so as to be laminated on the polarizing film through the retarder layer A1.

Evaluation Test

Figure 2:
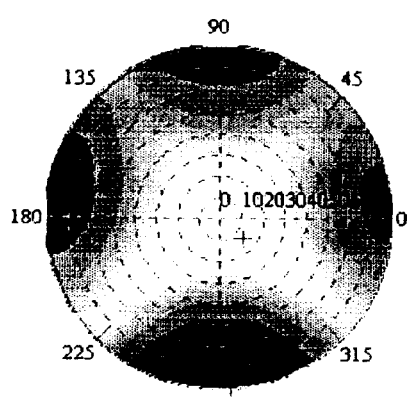
FIG. 2 is a graph showing isocontrast curves in Embodiment 1 and Comparative Example.
Figure 2:
Figure 2:
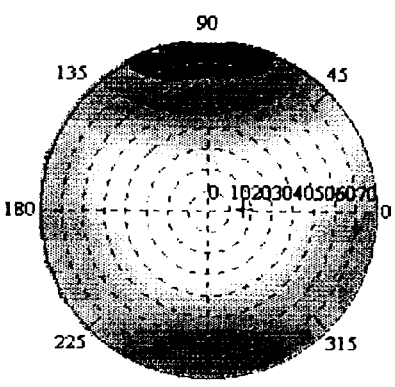

A pair of optically compensatory polarizing plates obtained in each of Example 1 and Comparative Example were bonded to opposite surfaces of a TN type liquid-crystal cell so that the polarizing plates looked outwards. Thus, a liquid-crystal display device was obtained. The viewing angle characteristic of display contrast of the liquid-crystal display device was examined by a contrast meter (EZContrast: made by ELDIM Corp.). Results of the examination were shown in FIG. 2 in terms of isocontrast curves. Further, viewing angle characteristics based on contrast 10 in the upper, lower, left and right sides were shown in the following Table. It is apparent from the aforementioned results that the viewing angle permitting good visibility is widened greatly approximately in all the directions in Example 1.

|  | Upper | Lower | Left | Right |
| --- | --- | --- | --- | --- |
| Example 1 | 80 degrees or more | 63 degrees | 80 degrees or more | 80 degrees or more |
| Comparative Example | 47 degrees | 61 degrees | 67 degrees | 61 degrees |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A composite retarder plate comprising:

(A) at least one retarder layer made of a high-molecular film satisfying a relation $nx > ny > nz$;

(B) at least one retarder layer satisfying a relation $nx \geq ny > nz$ and having an optical axis inclined relative to a direction of a normal line with respect to a plane of the layer (B); and (C) at least one retarder layer satisfying a relation of one of $nx > nz \geq ny$ and $nx > ny > nz$, wherein nx and ny are in-plane refractive indices and nz is a refractive index in a direction of thickness of each of said layers (A) to (C), and wherein ΔNxy and Rth given by $Nx \geq Ny$, $(Nx-Ny) \cdot D = \Delta Nxy$ and $\{(Nx+Ny)/2 - Nz\} \cdot D = Rth$ and based on monochromatic light with a wavelength of 590 nm are in a range of from 25 to 100 nm and in a range of from 100 to 300 nm respectively when Nx and Ny are in-plane refractive indices in said composite retarder plate, Nz is a refractive index in a direction of thickness of said composite retarder plate and D is the thickness of said composite retarder plate.

2. A composite retarder plate according to claim 1, wherein said high-molecular film constituting said retarder layer (A) has a photoelastic coefficient of not larger than $50 \times 10^{-13}$ cm²/dyn in terms of an absolute value thereof.

3. An optically compensatory polarizing plate comprising a composite retarder plate according to claim 1, and a polarizing plate.

4. An optically compensatory polarizing plate according to claim 3, wherein said high-molecular film constituting said retarder layer (A) has a photoelastic coefficient of not larger than $50 \times 10^{-13}$ cm²/dyn in terms of an absolute value thereof.

5. A liquid-crystal display device comprising a polarizing plate, a liquid-crystal cell, and a composite retarder plate according to claim 1, said composite retarder plate disposed between said polarizing plate and said liquid-crystal cell.

6. A liquid-crystal display device according to claim 5, wherein said high-molecular film constituting said retarder layer (A) has a photoelastic coefficient of not larger than $50 \times 10^{-13}$ cm²/dyn in terms of an absolute value thereof.

* * * * *